US012712795B2

(12) United States Patent
Filsfils et al.

(10) Patent No.: US 12,712,795 B2
(45) **Date of Patent: *Aug. 18, 2026**

(54) MICRO SEGMENT IDENTIFIER INSTRUCTIONS FOR PATH TRACING OPTIMIZATION

(71) Applicant: Cisco Technology, Inc., San Jose, CA (US)

(72) Inventors: Clarence Filsfils, Brussels (BE); Ahmed Mohamed Ahmed Abdelsalam, L'Aquila (IT); Rakesh Gandhi, Stittsville (CA); Pablo Camarillo Garvia, Madrid (ES); Francois Clad, Horbourg-Wihr (FR)

(73) Assignee: Cisco Technology, Inc., San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/771,934

(22) Filed: Jul. 12, 2024

(65) Prior Publication Data

US 2024/0372793 A1 Nov. 7, 2024

Related U.S. Application Data

(63) Continuation of application No. 18/234,276, filed on Aug. 15, 2023, now Pat. No. 12,088,484, which is a (Continued)

(51) Int. Cl.

*H04L 43/0805* (2022.01)
*H04L 41/12* (2022.01)

(Continued)

(52) U.S. Cl.

CPC .......... *H04L 43/0805* (2013.01); *H04L 41/12* (2013.01); *H04L 43/0852* (2013.01);

(Continued)

(58) Field of Classification Search

CPC . H04L 43/0805; H04L 41/12; H04L 43/0852; H04L 43/106; H04L 43/12;

(Continued)

(56) References Cited

U.S. PATENT DOCUMENTS

| | | | |
|---|---|---|---|
| 6,751,209 | B1 | 6/2004 | Hamiti et al. |
| 7,016,351 | B1 | 3/2006 | Farinacci et al. |

(Continued)

FOREIGN PATENT DOCUMENTS

| | | | |
|---|---|---|---|
| CN | 103534993 | A | 1/2014 |
| CN | 103650575 | A | 3/2014 |

(Continued)

OTHER PUBLICATIONS

Office Action for Chinese Application No. 202180080806.4, Dated Jun. 24, 2025, 56 pages.

(Continued)

*Primary Examiner* — Abdulkader M Alriyashi
(74) *Attorney, Agent, or Firm* — Lee & Hayes, P.C.

(57) ABSTRACT

Techniques for optimizing technologies related to network path tracing and network delay measurements are described herein. Some of the techniques may include using an IPv6 header option and/or segment identifier field of a segment list or a TLV of a segment routing header as a telemetry data carrier. The techniques may also include using an SRv6 micro-segment (uSID) instruction to indicate to a node of a network that the node is to perform one or more path tracing actions and encapsulating the packet and forward. Additionally, the techniques may include using short interface identifiers corresponding to node interfaces to trace a packet path through a network. Further, the techniques may include using short timestamps to determine delay measurements associated with sending a packet through a network. In various examples, the techniques described above and (Continued)

herein may be used with each other to optimize network path tracing and delay measurement techniques.

20 Claims, 11 Drawing Sheets

Related U.S. Application Data continuation of application No. 17/344,477, filed on Jun. 10, 2021, now Pat. No. 11,757,744.

(60) Provisional application No. 63/119,938, filed on Dec. 1, 2020, provisional application No. 63/119,964, filed on Dec. 1, 2020, provisional application No. 63/119,992, filed on Dec. 1, 2020, provisional application No. 63/120,002, filed on Dec. 1, 2020.

(51) Int. Cl.

| | |
|---|---|
| ***H04L 43/0852*** | (2022.01) |
| ***H04L 43/106*** | (2022.01) |
| ***H04L 43/12*** | (2022.01) |
| ***H04L 45/12*** | (2022.01) |
| ***H04L 45/42*** | (2022.01) |
| ***H04L 45/741*** | (2022.01) |
| ***H04L 69/22*** | (2022.01) |

(52) U.S. Cl.

CPC ............ *H04L 43/106* (2013.01); *H04L 43/12* (2013.01); *H04L 45/123* (2013.01); *H04L 45/42* (2013.01); *H04L 45/741* (2013.01); *H04L 69/22* (2013.01)

(58) Field of Classification Search

CPC ..... H04L 45/123; H04L 45/42; H04L 45/741; H04L 69/22; H04L 43/0858

See application file for complete search history.

(56) References Cited

U.S. PATENT DOCUMENTS

| | | | |
|---|---|---|---|
| 10,284,460 | B1 | 5/2019 | BShara et al. |
| 10,764,175 | B1 | 9/2020 | Filsfils et al. |
| 2002/0101839 | A1 | 8/2002 | Farley et al. |
| 2003/0193950 | A1 | 10/2003 | Philips et al. |
| 2005/0007961 | A1 | 1/2005 | Scott et al. |
| 2005/0013251 | A1 | 1/2005 | Wang et al. |
| 2010/0125661 | A1 | 5/2010 | Perala et al. |
| 2012/0166637 | A1 | 6/2012 | White, Jr. et al. |
| 2013/0063660 | A1 | 3/2013 | Sullivan |
| 2014/0185570 | A1 | 7/2014 | Farley |
| 2015/0003255 | A1 | 1/2015 | Frost et al. |
| 2015/0125131 | A1 | 5/2015 | Soroushian et al. |
| 2015/0256456 | A1 | 9/2015 | Previdi et al. |
| 2016/0142291 | A1 | 5/2016 | Polland |
| 2016/0330111 | A1 | 11/2016 | Manghirmalani et al. |
| 2017/0155592 | A1 | 6/2017 | Chen |
| 2018/0069780 | A1 | 3/2018 | Dhanabalan |
| 2019/0190818 | A1 | 6/2019 | Ceccarelli et al. |
| 2019/0349279 | A1 | 11/2019 | Fang et al. |
| 2020/0092211 | A1 | 3/2020 | Vytla et al. |
| 2020/0099611 | A1 | 3/2020 | Filsfils et al. |
| 2020/0204469 | A1 | 6/2020 | Filsfils et al. |
| 2021/0092037 | A1 | 3/2021 | Rathi |
| 2021/0092053 | A1 | 3/2021 | Filsfils |
| 2021/0144082 | A1 | 5/2021 | Bisht et al. |
| 2022/0029879 | A1 | 1/2022 | Dong et al. |
| 2022/0060403 | A1 | 2/2022 | Amadie et al. |
| 2022/0173992 | A1 | 6/2022 | Filsfils et al. |
| 2022/0174011 | A1 | 6/2022 | Filsfils et al. |
| 2023/0336450 | A1 | 10/2023 | Filsfils |
| 2023/0388207 | A1 | 11/2023 | Filsfils |
| 2024/0406086 | A1 | 12/2024 | Abdelsalam |

FOREIGN PATENT DOCUMENTS

| | | | |
|---|---|---|---|
| EP | 3737048 | A1 | 11/2020 |
| WO | WO2019030552 | A1 | 2/2019 |

OTHER PUBLICATIONS

Brockners F et al: "Data Fields for In-situ OAM draft-ietf-ippm-ioam-data-04", Internet-Draft, Oct. 20, 2018 (Oct. 20, 2018), pp. 1-39, XP055823565, sections 4.2, 4.2.2, 4.2.3.

The Invitation to pay additional fees for PCT App. No. PCT/US21/60738, mailed Feb. 25, 2022.

Tulumello, Angelo, et al., "Micro SIDs: A Solution for Efficient Represenatation of Segment IDs in SRv6 Networks," downloaded Oct. 16, 2020, from https://arxiv.org/; Published Jul. 23, 2020, 12 pages.

Non-Final Office Action for U.S. Appl. No. 18/207,568, dated Mar. 13, 2024, 8 Pages.

Office Action for U.S. Appl. No. 17/344,443, mailed on Nov. 23, 2022, Clarence Filsfils, "Telemetry Data Optimization for Path Tracing and Delay Measurement", 12 pages.

Office Action for U.S. Appl. No. 17/344,477, mailed Jun. 27, 2022, Filsfils, "Micro Segment Identifier Instructions for Path Tracing Optimization", 9 pages.

Office Action for U.S. Appl. No. 17/344,443, mailed on Aug. 17, 2022, Filsfils, "Telemetry Data Optimization for Path Tracing and Delay Measurement", 9 pages.

The International Search Report and Written Opinion for PCT Application No. PCT/US21/60738, mailed Apr. 19, 2022.

200

IPv6 Header 204
HBH Header Telemetry Carrier 206
Segment Routing Header 208
Segment List [0] 210(1)
Segment List [1] 210(2)
. . .
Segment List [N] 210(N)
Payload 212

202

IPv6 Header 204
Segment Routing Header 208
Segment List [0] 210(1)
Segment List [1] 210(2)
. . .
Segment List [N] 210(N)
SRH TLV Telemetry Carrier 214
Payload 212

300

| CMD[0] 302(1) | CMD[1] 302(2) | CMD[2] 302(3) | CMD[3] 302(4) |
|---|---|---|---|
| ... | | | |
| CMD[...] 302(5) | CMD[...] 302(6) | CMD[...] 302(7) | CMD[N] 302(N) |
| SOURCE NODE FULL TIMESTAMP 304 | | | |
| SINK NODE FULL TIMESTAMP 306 | | | |

320

MICRO SEGMENT IDENTIFIER INSTRUCTIONS FOR PATH TRACING OPTIMIZATION

RELATED APPLICATIONS

This application claims priority to and is a continuation of U.S. patent application Ser. No. 18/234,276, filed on Aug. 15, 2023, which claims priority to and is a continuation of U.S. patent application Ser. No. 17/344,477, filed Jun. 10, 2021, which claims priority to U.S. Provisional Patent Application Nos. 63/119,938, 63/119,964, 63/119,992, and 63/120,002, each of which were filed on Dec. 1, 2020. The entire contents of each of the above listed applications are incorporated herein by reference and for all purposes.

TECHNICAL FIELD

The present disclosure relates generally to improved network path tracing and delay measurement techniques.

BACKGROUND

Path tracing solutions and data plane monitoring techniques can provide network operators with improved visibility into their underlying networks. These solutions collect, from each node in a traffic flow, various information associated with the nodes, such as device identifiers, port identifiers, etc. as packets traverse through them. The collected information can travel with the packet as telemetry data while the packet traverses the network and can be used to determine the actual path through the network taken by the packet. Traditional network telemetry solutions typically use anywhere from 24 to 128-bits to represent a device or node identifier (e.g., IP address, segment identifier, etc.), as well as 16-bits to represent ingressing/egressing ports of the device or node.

Similarly, delay measurement solutions allow network operators to characterize delays experienced by packets traversing the network. These delay measurement solutions can offer end-to-end, as well as per-hop delay measurements. Traditional delay measurement solutions that provide both end-to-end and per-hop delay measurements generally require the collection of the timestamp, from each node that receives and/or forwards the packet through the network. Similar to above, the collected timestamps can also travel with the packet as telemetry data while the packet traverses the network. However, these traditional delay measurement solutions typically use standard timestamp formats having a 64-bit construct in which the 32 most significant bits represent the seconds since an epoch and the 32 least significant bits represent the fraction within that second in nanosecond or picosecond accuracy.

However, the number of bits used by these traditional network telemetry and delay measurement solutions are much higher than what may be actually needed. Further, this telemetry data is generally collected from each node that receives and/or forwards the packet, thus leading to a number of problems, such as significant overhead, exceeding device or node hardware limitations, increase of network utilization, dropped packets based at least in part on large maximum transmission unit (MTU) size, and the like. In addition, traditional solutions for carrying the collected information and timestamps described above as telemetry data within a packet may not work the same on different types of networking devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
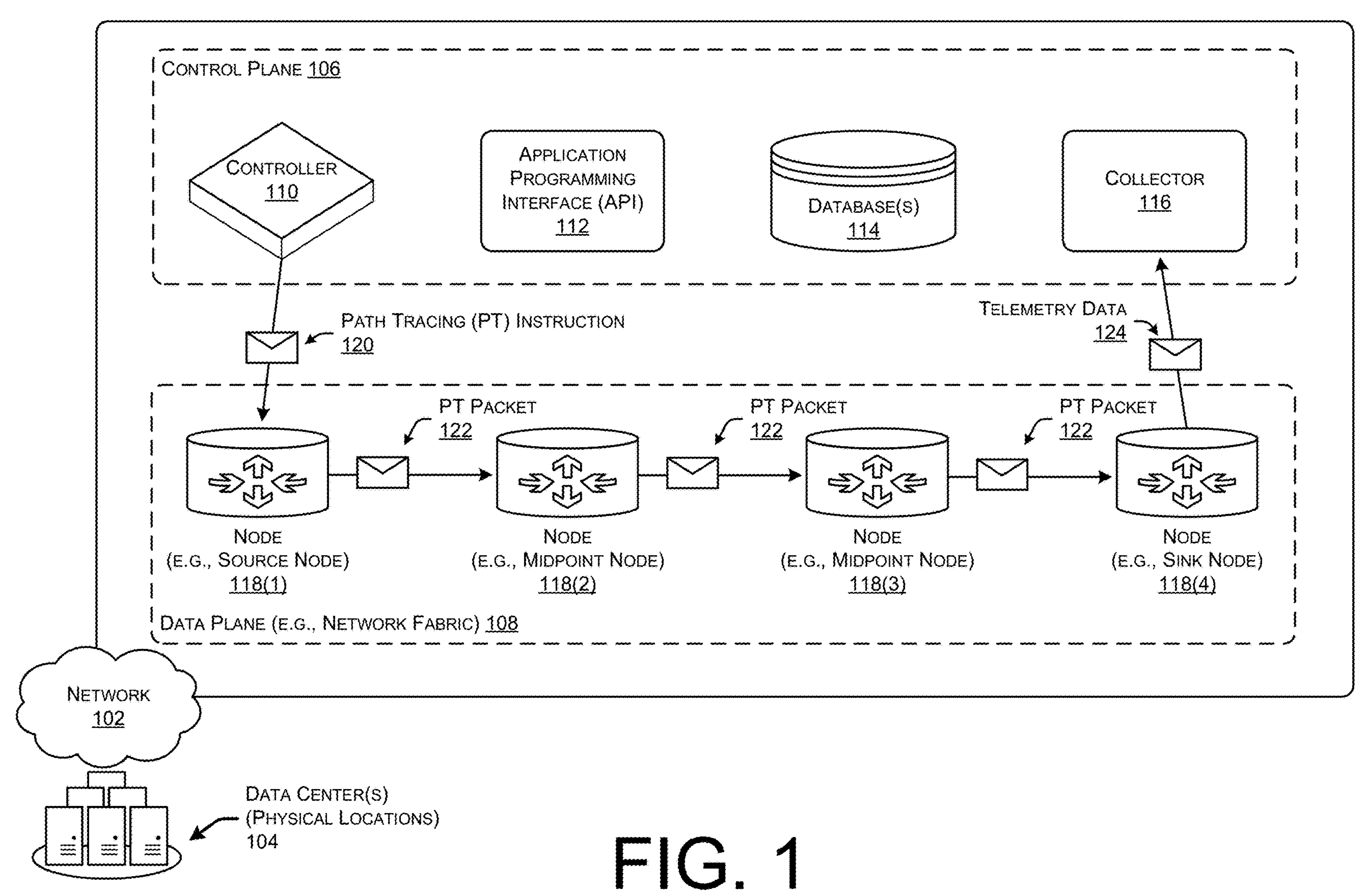
FIG. 1 illustrates a schematic view of an example system-architecture of a network in which the techniques described herein may be implemented.

This disclosure describes systems and methods that, among other things, improve technologies related to network path tracing and network delay measurements. By way of example, and not limitation, a method according to the various techniques described in this disclosure may be performed by a sink node of a network. In some examples, the method may include determining that an address field of an Internet Protocol version 6 (IPv6) header of a packet includes a Segment Routing over IPv6 (SRv6) micro segment (uSID) instruction. The method may also include determining that the SRv6 uSID instruction indicates a path tracing action that is to be performed by the sink node, as well as performing the path tracing action. In some examples, at least one of the packet, a clone of the packet, or telemetry data associated with the path tracing action may be sent to a controller of the network.

Additionally, the techniques described herein may be performed as a method and/or by a system having non-transitory computer-readable media storing computer-executable instructions that, when executed by one or more processors, performs the techniques described herein.

EXAMPLE EMBODIMENTS

As discussed above, path tracing solutions and data plane monitoring techniques can provide network operators with improved visibility into their underlying networks. However, the number of bits used to represent important path tracing and delay measurement data (e.g., timestamps, device/node identifiers, etc.) may be much higher than what might actually be necessary. Because this telemetry data is generally collected from each node that receives and/or forwards the packet, existing techniques are generally associated with a number of problems, such as significant overhead, exceeding device or node hardware limitations, increase of network utilization, dropped packets based at least in part on large maximum transmission unit (MTU) size, and the like. Furthermore, traditional solutions for carrying the collected information and timestamps described above as telemetry data within a packet may not work the same on different types of networking devices, thus requiring special programming in certain networks in order to perform the desired techniques.

Accordingly, this disclosure is directed to various techniques for improved path tracing and delay measurement solutions. One aspect of the various techniques disclosed herein includes using short (e.g., 8-bit, 12-bit, etc.) interface identifiers (IDs) for tracing a packet path through a network. Using short interface IDs solves many of the root causes associated with excessive telemetry data overhead and processing efficiency. With respect to the traditional path tracing and data plane monitoring techniques described above, the short interface ID solution described herein allows a packet path to be traced by collecting just the short ID of, for instance, the incoming interface that receives a packet at each node or outgoing interface that sent a packet at each node. Thus, using this technique there may be no need to collect the traditionally long (e.g. 32-bit, 128-bit, etc.) node/switch identifier. Additionally, less overhead is required to collect the telemetry data, and hardware complexity may be simplified in terms of a depth of the packet header in which the telemetry data is to be read and written by hardware.

In some examples, a centralized controller of the network may have the topology information of the network, and each node of the network may export their configuration to the centralized controller. The controller, which has a full view of the network topology, may then assign, for each node, an identifier corresponding to each interface of a node (interface ID). For instance, if a single node in the network has 10 different communication interfaces, then the node may receive 10 interface IDs; that is, one interface ID to identify each interface. This may also include assigning interface IDs to path tracing capable nodes that will allow a collector/analyzer/controller to identify hidden nodes (e.g., in Brownfield networks).

In various examples, the number of bits required to represent a single interface ID may be upper bounded by a maximum number of interfaces on a router. In this way, an interface ID assigned to an interface will be unique within its own router/node. In some examples, for a network with maximum interfaces of any given router equal to $2^n$, the controller would need at most n-bits to represent the interface ID. In at least one example, a packet path is uniquely identified using the 3-tuple (iPE_OUT, ePE_IN, <ID_seq>), where iPE_OUT is the interface ID of the outgoing interface of the ingress provider edge node (source node) sending the path tracing packet, ePE_IN is the interface ID of the incoming interface of the egress provider edge node (sink node) receiving the path tracing packet, and ID_seq is the sequence of interface IDs collected from, and representing, any midpoint nodes that forwarded the packet from the ingress provider edge node to the egress provider edge node.

Another aspect of this disclosure includes techniques for determining network delay measurements using short (e.g. 8-bit, etc.) hardware timestamps. Similar to using short interface identifiers, short timestamps may be collected at each node to also solve many of the root causes associated with excessive telemetry data overhead and processing efficiency. With respect to prior delay measurement techniques, this solution provides a mechanism to record short timestamps at each midpoint node that forwards the packet. Additionally, the mechanism is general and may be adapted based on the type of network, required latency precision, or max number of bits available to record the timestamp. This solution results in smaller telemetry data (e.g., 8-bit timestamp versus, for instance, a 64-bit timestamp) while still preserving timestamp precision requirements of the various types of networks.

Traditional telemetry solutions typically record full 64-bit timestamps as telemetry data attached to the packet at each hop. However, the 64-bits recorded at each node contain many redundant bits considering the short lifetime of the packet in the network. Additionally, a 64-bit timestamp also contains unnecessary bits considering the required time precision. For example, in a network where the packet lifetime is less than 1 second and the required time precision is in terms of microseconds, the 32-bits of seconds of the timestamp encoded by each hop are the same and will be redundant, and bits encoding the fractions of microseconds are unnecessary as well. In other words, out of those 64-bits more than two-thirds are unneeded in the above example.

In some examples, and according to the short timestamp techniques described herein, however, in a network where packet lifetime is greater than one second, a short timestamp can include few of the least significant bits of the seconds portion of a full timestamp and the remaining bits may be taken from the fraction part of the full timestamp. On the other hand, in networks where packet lifetime is less than one second, the short timestamp may include bits from the fraction part only. When determining which bits of a full timestamp should be chosen for a short timestamp, the number of bits and their selected position gives a rollover and precision. For instance, the selection of the bits position has to be chosen such that rollover is greater than the one-way delay between source node to sink node, and/or that rollover is greater than the one-way delay between any two timestamping nodes in the network.

When a packet enters the network at a source node, the source node may record a full timestamp as telemetry data to be carried in the packet. As the packet traverses the network, each midpoint (e.g., transit) node and, in some instances, the sink node, may record a short timestamp as telemetry data. The sink node may also record a full timestamp (instead of short timestamp) as telemetry data to be carried in the packet. In this way, a controller or collector may compute full timestamps for each midpoint node. This may be done by the controller or collector by combining (e.g., adding) the recorded short timestamp and the most significant bit of the full timestamp determined for the previous node. For the first midpoint node, the most significant bit of the full timestamp may be taken from the source node's timestamp.

Another aspect of this disclosure includes techniques for packet telemetry carriers for different networks and/or different hardware. A first solution includes using an IPv6 Hop-by-Hop (HBH) header, which comes immediately after the IPv6 header and before the Segment Routing Header (SRH). These techniques define a new HBH option type to carry telemetry data. However, some hardware cannot process HBH+SRH, and such hardware assumes that the SRH is the next header after the IPv6 header. A second solution includes using the SRH TLV, which comes at the end of the SRH. These techniques define a new SRH TLV with space to carry telemetry data.

Another technique of this disclosure includes a telemetry data carrier for SRv6 networks in which the telemetry carrier may be added as a new SID immediately after the base SRH header. The new SID may be used solely for telemetry collection purpose and may not affect any of the SRv6 deployed services. With respect to the prior solutions described above, the techniques described herein for using the SID list as a telemetry carrier allows the packet to carry the telemetry data as part of the SRH without being very deep in the packet since the location is early in the packet. Additionally, the disclosed techniques avoid having a HBH header in between the IPv6 header and the SRH header, thus solving the problem of hardware which cannot process packets with HBH+SRH headers. Further, with the telemetry carrier encoded immediately after the SRH base HDR, the telemetry data collection has no impact on hardware with limitations on how deep they can write into the packet and is transparent to SRv6 Traffic Engineering (TE)/Endpoint nodes. In sum, the disclosed techniques provide an improved way to collect telemetry data which works on, both, hardware that has limits on write-depth in the packet, as well as hardware that cannot process HBH. The telemetry data carrier described herein may be used to carry the short timestamps and short interface IDs as described herein, as well as other types of telemetry data.

Yet another aspect of this disclosure includes techniques for SRv6 micro segment identifier (uSID) network programming instructions that define path tracing action on a router. In some examples, a node can trigger a specific path tracing action by specifying it in the next SRv6 uSID network programming path tracing instruction. This SRv6 uSID path tracing instruction can be a well-known value, globally defined in the network within a domain, and/or programmed on each node. This SRv6 uSID instruction can be a local on a node and advertised to the network. For instance, a first SRv6 uSID path tracing instruction may prompt a node to insert a short or full timestamp, the short interface ID and encapsulate the packet with SR Policy/IPv6 header, including IPv6 hop-by-hop option and/or SRH with a TLV containing additional telemetry information on the node. Additionally, a second SRv6 uSID path tracing instruction may prompt the node to clone the packet, insert the short or full timestamp, the short interface ID and encapsulate the packet with the SR Policy/IPv6 header, including IPv6 hop-by-hop option and/or SRH with a TLV containing additional telemetry information on the node. These SRv6 uSID path tracing instructions may be enabled on any midpoint nodes, as well as sink nodes. These behaviors defined with SRv6 uSID instructions may be also triggered on a node by a specific hop-by-hop option type or SRH TLV type or some other indication in the header or by using a local policy on a node.

As an example of using these SRv6 uSID path tracing instructions, a controller may request a source node of a network to generate path tracing probe messages, and the controller may also provide the probe endpoint address in the form of an SRv6 uSID carrier. Additionally, the controller may also provide the source-address of the customer data traffic, DSCP, packet size, and Flow-label value range for ECMP tracing. The source node of the network may then craft one or more IPv6 path tracing probe messages containing a Hop-By-Hop option to carry short interface IDs and/or short timestamps, as well as SRH metadata to carry short timestamp information, and then insert its transmit short or full timestamp and short outgoing interface identifier upon sending the message. The Source node may then send the path tracing probe message(s) and sweep a range of flow label in the IPv6 header to traverse all ECMPs to reach the sink node. It may also sweep a range of DSCP values. In some examples, each midpoint node may insert its incoming or outgoing short interface ID and its receive or transmit short timestamp in the hop-by-hop option of the path tracing message or segment identifiers in the SRH of the message, or in a variant of the proposal in SRH TLV of the message, and then forward the message downstream. The sink node may then add its receive and/or transmit short or full timestamp, short interface identifier, add new encapsulation with SRv6/IPv6 header, optionally with new hop-by-hop option and/or new SRH TLV and forward the path tracing message to the controller based on the SRv6 uSID network programming instruction.

According to the techniques described herein, improvements in computer-related technology may be realized. For instance, by using short interface identifiers and short timestamps for packet path tracing and determining network delay measurements, less overhead may be required. Additionally, hardware complexity may be simplified in terms of a depth of the packet header in which the telemetry data is to be written by hardware, thus allowing different types of hardware devices in SRv6 networks to perform path tracing and network delay measurements which were not otherwise performable by those hardware devices. The discussion above is just some examples of the multiple improvements that may be realized according to the techniques described in this disclosure. These and other improvements will be easily understood and appreciated by those having ordinary skill in the art.

By way of example, and not limitation, a method according to the various techniques described by this disclosure may include receiving a packet at a first node of a network that is to be sent to at least a second node of the network. In various examples, the packet may include a first indication of a specific type of telemetry data (e.g., short interface ID, short timestamp, full timestamp, node identification data, and the like) that that the first node is to append (insert or update) to the packet. In at least one example, the packet may also include a second indication of a first location within a segment identifier (SID) list of a segment routing header of the packet where the first node is to append (insert or update) the specific type of the telemetry data. In another example the node may append the specific type of telemetry data to Hop-by-hop option of the packet. In another example, the node may append the specific type of telemetry data to the SRH TLV of the packet. In some examples, the first indication and/or the second indication may be included within a first field (e.g., Tag field) of the segment routing header of the packet. In some examples, the first indication and/or the second indication may be included in the IPv6 Hop-by-hop option of the packet. In some examples, the first indication and/or the second indication may be included in the TLV of the SRH of the packet. In at least one example, the first node is a source node, and, in another example, the first node is a midpoint node.

In some examples, the method may also include determining, by the first node, first telemetry data of the specific type that is associated with the first node. The specific type of telemetry data may include, in some instances, one or more of a short interface ID indicative of an interface of the first node used to either one of send the packet or receive the packet, timestamp data representing a time at which the first node handled (e.g., sent, received, modified, etc.) the packet, or short timestamp data representing a portion of a full timestamp associated with when the first node handled the packet. In some examples, the first node may determine the first telemetry data based at least in part on the first indication. For instance, the first node may determine that a flag field of the segment routing header is enabled and, based at least in part on the flag field being enabled, the first node may read the first indication and the second indication. In at least one example, the first indication and the second indication may be included in a same field of the segment routing header of the packet (e.g., included in a 16-bit Tag field, where a first 8 bits of the 16-bit Tag field represent the first indication and a second 8 bits of the 16-bit Tag field represent the second indication, or indicated in IPv6 hop-by-option option (e.g. first 16-bits in the option data) or indicated in SRH TLV (e.g. first 16-bits in the TLV data) fields. The indication may include the location, format, and type of telemetry data to be appended.

Additionally, in some examples the method may include appending, by the first node, the first telemetry data at the first location within the SID list. For instance, based at least in part on the second indication, the first node may determine the first location within the SID list where the first telemetry data is to be appended. In some examples, the first location may correspond with a location of 8 bits within a first SID field of the SID list. Additionally, or alternatively, the second indication indicating the location may indicate an n-bit offset at which the first node is to write the telemetry data in the first SID field of the SID list, wherein "n" represents a number of bits at which the telemetry data is to be offset. In some examples, the IPv6 hop-by-hop option is used instead of using SID list for these purposes. The hop-by-hop option nay be proffered due to its ability to be flexible. In some other examples, the SRH TLV is used instead of using SID List for these purposes.

In some examples, the first node may modify the second indication of the packet to indicate a second location within the SID list where the second node is to append second telemetry data of the specific type that is associated with the second node. That is, for example, after appending the first telemetry data, the first node may indicate a location of a bit within the SID list where the second node is to begin appending telemetry data. As above, the second location may be located within the first SID field of the SID list. Additionally, the first node may send the packet to the second node, the packet including the first telemetry data and the second indication indicating the second location. In some examples, the IPv6 Hop-By-Option is used instead of using SID list for these purposes. The Hop-by-hop option nay be proffered due to its ability to be flexible. In some other examples, the SRH TLV is used instead of using SID List for these purposes.

In various examples, the second node may receive the packet determine, based at least in part on the first indication, the second telemetry data of the specific type that is associated with the second node. Additionally, the second node may append the second telemetry data at the second location within the SID list based at least in part on the second indication indicating the second location. In at least one example, the second node may be a midpoint node and the second node may modify the second indication of the packet to indicate a third location within the SID list where a third node is to append third telemetry data of the specific type that is associated with the third node. Additionally, the second node may send the packet to the third node, the packet including the first telemetry data, the second telemetry data, and the second indication indicating the third location. In some examples, the IPv6 Hop-By-Option is used instead of using SID list for these purposes. The Hop-by-hop option nay be proffered due to its ability to be flexible. In some other examples, the SRH TLV is used instead of using SID List for these purposes.

In some examples, the second node may be a sink node (e.g., an egress provider edge node) of the network and the method may include determining, by the second node, that the packet includes an SRv6 micro-segment (uSID) instruction. The SRv6 uSID instruction may be associated with one or more path tracing instructions. In some examples, the SRv6 uSID instruction may be included within a destination address field of the packet (e.g., within a segment list of a segment routing header of the packet, within an IPv6 destination address field of the packet, and the like). The second node may, in some instances, determine that the packet includes the SRv6 uSID instruction by shifting the destination address field of the packet to determine a next SRv6 uSID instruction. That is, the destination address field may be used to carry the SRv6 uSID instruction associated with the path tracing action and one or more other SRv6 uSID instructions indicating next segments where the packet is to be sent. As such, the second node may shift the destination address field by default to determine the next SRv6 uSID instruction (e.g., next SRv6 uSID indicating a next segment where the packet is to be sent), but the next uSID instruction may be associated with the path tracing action instead of a next hop of the packet.

In some examples, the SRv6 uSID instruction may be configured to prompt the second node to perform the one or more path tracing actions. As such, the method may also include performing, by the second node, the path tracing actions based at least in part on reading the SRv6 uSID instruction. In at least one example, the path tracing actions may include determining the second telemetry data of the specific type that is associated with the second node and appending the second telemetry data at the second location within the SID list. For instance, one of the path tracing actions may include determining and/or appending timestamp data (e.g., short timestamp, full timestamp, etc.) representing a time at which the second node received the packet. Additionally, or alternatively, a path tracing action may include appending interface identification data to the packet indicative of an interface of the second node that was used to receive the packet. Another path tracing action may include adding new encapsulation on top of existing headers and its TLV extensions and sending the packet to a controller or collector of the network that is configured to perform an Operations, Administration, and Maintenance (OAM) action (e.g., tracing a path the packet used to traverse the network, determining a latency associated with sending the packet through the network, etc.).

In some examples, the SRv6 uSID instruction may instruct the second node to clone the packet, and send the cloned packet to the controller or collector of the network. The cloned packet may include the telemetry data appended by the first node and the second node. In some examples, the second node may add new encapsulation on top of existing headers including its TLVs to send the packet, including the telemetry data, to the controller or collector of the network.

In various examples, the method may include receiving the telemetry data at the controller or collector. In some examples, the telemetry data may include multiple interface identifiers (e.g., short interface IDs) indicating interfaces of nodes of the network that sent or received the packet. For instance, the telemetry data may include a first interface identifier that is associated with the first node of the network. The first interface identifier may be indicative of a first interface of the first node that was used to either receive the packet and/or send the packet to a second node. In some examples, the telemetry data may also include a second interface identifier that is associated with the second node of the network. The second interface identifier may be indicative of a second interface of the second node that was used to either receive the packet from the first node and/or send the packet.

In some examples, the controller or collector may determine, based at least in part on the telemetry data, a path through the network according to which the packet was sent, the path including at least the first node and the second node. For instance, the path may include an indication of each node of the network that sent or received the packet. In some instances, the controller or collector may receive topology data associated with the network and determine the path based at least in part on the topology data. Additionally, the controller or collector may determine the path based at least in part on a 3-tuple, the 3-tuple including the first interface identifier, the second interface identifier, and one or more interface identifiers indicative of a sequence of midpoint nodes between the first node and the second node that forwarded the packet.

Based at least in part on the path, the method may include determining whether an anomaly exists in the network. For instance, the controller or collector may determine whether the anomaly exists in the network. In some instances, the anomaly may include the path being a wrong shortest path through the network, the path being a wrong equal-cost multi-path (ECMP) route, the network including a failed link, a failed node, etc., and/or the like In some examples, the telemetry data may additionally or alternatively include a first full timestamp indicative of a first time at which the packet was handled (e.g., received, sent, modified, etc.) by the first node. Additionally, the telemetry data may also include a short timestamp representing a portion of a second full timestamp that is indicative of a second time at which the packet was handled by the second node. The method may also include determining the second full timestamp based at least in part on the first full timestamp and the short timestamp, and calculating, based at least in part on the first full timestamp and the second full timestamp, a latency associated with sending the packet through the network.

In some examples, the telemetry data may include a first full timestamp representing a time at which a source node handled the packet, and the telemetry data may also include multiple short timestamps representing respective times at which other nodes of the network handled the packet. The controller or collector may determine full timestamps for each of the multiple short timestamps based at least in part on the first full timestamp, as well as other full timestamps determined from the short timestamps. In some instances, the latency may include one or more of link (or hop) delays between individual nodes of the network, an end-to-end latency between a source node and a sink node of the network, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic view of an example system-architecture 100 of a network 102 in which the techniques described herein may be implemented. Generally, the network 102 may include devices that are housed or located in one or more data centers 104 that may be located at different physical locations. For instance, the network 102 may be supported by networks of devices in a public cloud computing platform, a private/enterprise computing platform, and/or any combination thereof. The one or more data centers 104 may be physical facilities or buildings located across geographic areas that are designated to store networked devices that are part of the network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network 102 may not be located in explicitly defined data centers 104 and, rather, may be located in other locations or buildings.

The network 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The network 102 may include devices, virtual resources, or other nodes that relay packets from one network segment to another.

The network 102 may include or otherwise be distributed (physically or logically) into a control plane 106 and a data plane 108 (e.g., a network fabric). The control plane 106 may include a controller 110, an application programming interface 112, one or more databases 114, and a collector 116. The data plane 108 may include one or more nodes 118(1)-118(4) (hereinafter referred to collectively as "nodes 118").

The controller 110 may, in some examples, assign different interface identifiers (IDs) to respective interfaces of the nodes 118. For instance, the controller 110 may assign a first interface ID to a first interface of the node 118(1), a second interface ID to a second interface of the node 118(1), a third interface ID to an interface of the node 118(2), and so forth. Additionally, the controller 110 may send a path tracing instruction 120 to the node 118(1) (which may be configured as a source node (e.g., source provider edge node)) to instruct the node 118(1) to start a telemetry collection session (for path tracing and/or delay measurements) using injected probes, in band traffic flows, or by sampling traffic flows. In some examples, the controller 110 may configure the midpoint nodes 118(2) and 118(3) with a number of bits, as well as which specific bits of a full timestamp that are to be used to encode a short timestamp in received path tracing packets 122. The controller 110 may also configure the node 118(4) (which may be configured as a sink node (e.g., egress provider edge node)) to report the collected telemetry data 124 to the collector 116. In some examples, the controller 110 may have access to topology information of the network 102, and the nodes 118 may export their configurations to the controller 110.

In FIG. 1 the node 118(1) is configured as a source node (or headend node), such as an ingress provider edge router, a top of rack switch, a SmartNIC, etc. The source node 118(1) may receive the path tracing instruction 120 from the controller 110 and start a telemetry collection session. For instance, the source node 118(1) may allocate room in the telemetry collection packet/header of the path tracing packet 122 for a number of hops specified in the path tracing instruction 120. The source node 118(1), as part of allocating the room in the telemetry collection packet/header of the path tracing packet 122, may include an indication in the packet that instructs the downstream nodes 118(2)-118(4) as to a type of telemetry data that the downstream nodes 118(2)-118(4) are to add to the packet, as well as a specific location in the packet where the downstream nodes 118(2)-118(4) are to append the telemetry data. This may minimize the amount of work to be done by the downstream nodes 118(2)-118(4), resulting in minimal delay and/or more precise delay measurements. In some examples, the source node 118(1) may record its short interface ID of an outgoing interface used to send the path tracing packet 122. Additionally, or alternatively, the source node 118(1) may record its full timestamp, which may then be used by the collector 116 to determine full timestamps for the downstream nodes 118(2)-118(4) (which may append their short timestamps). In some instances, the source node 118(1) may record the interface ID and/or the timestamp at the end of the telemetry data carrier such that the downstream nodes 118(2)-118(4) may not have to write as deep in the packet to record their telemetry data.

In some examples, the source node 118(1) may encapsulate the path tracing packet 122 with a segment routing header such that the telemetry data may be carried in a last segment identifier field of a segment list of the segment routing header. For instance, the source node 118(1) may encapsulate the path tracing packet 122 with a segment routing header and set a value of the segment routing header "T" flag to enable the downstream nodes 118(2)-118(4) to read a Tag field of the segment routing header. Additionally, the source node 118(1) may encode the Tag field of the segment routing header to indicate what type of telemetry data is to be encoded by the downstream nodes 118(2)-118(4), as well as an offset within the telemetry carrier (the segment identifier field of the segment list) where the downstream nodes 118(2)-118(4) should write their telemetry data. The source node may encode the telemetry data in IPv6 hop-by-hop option instead of encoding in segment list in SRH. In. another example, the source node may encode the telemetry data in a TLV in SRH instead of encoding in segment list in SRH.

The midpoint nodes 118(2) and 118(3) may receive the path tracing packet 122. In turn, the midpoint nodes 118(2) and 118(3) may record their telemetry data (e.g., short timestamp, short interface ID, etc.) within the path tracing packet 122. In some examples, the midpoint nodes 118(2) and 118(3) may receive the path tracing packet 122, read the "T" flag value of the segment routing header and, if "T" is enabled, read the Tag field of the segment routing header to determine which type of telemetry data to record in the path tracing packet 122 and record the telemetry data at a location specified by an indication in the Tag field. For instance, the Tag field may include a first indication (e.g., "action" bits) that indicates the type of telemetry data and a second indication (e.g., "offset" bits) that indicates the offset where the telemetry data is to be recorded within the telemetry carrier of the path tracing packet 122. The midpoint nodes 118(2) and 118(3) may, in turn, forward the path tracing packet 122 downstream. The midpoint node may use the indication (action/offset bits) from and encode the telemetry data in IPv6 hop-by-hop option instead of encoding in segment list in SRH. In. another example, the midpoint node may use the indication (action/offset bits) from and encode the telemetry data in a TLV in SRH instead of encoding in segment list in SRH.

The sink node 118(4) (or tail end node) may, in some examples, receive the path tracing packet 122 from the midpoint node 118(3), record its own telemetry data (e.g., short timestamp, full timestamp, interface ID, etc.), and forward all of the telemetry data 124 (e.g., all of the telemetry data added by the nodes 118(1)-118(4)) to the collector 116. In some examples, if the sink node 118(4) determines, upon receiving the path tracing packet 122, that the "T" flag is enabled and segments left is equal to 1, the sink node 118(4) may export the telemetry data 124 to the collector 116, add new segment routing header and IPv6 encapsulation, and/or forward the entire packet including its headers to its destination (e.g. collector). In some examples, the path tracing packet 122 may include a uSID instruction that prompts the sink node 118(4) to perform some or all of these path tracing actions. In some instances, the path tracing actions that are associated with a specific uSID instruction may be globally defined within the network 102 and/or defined locally on the individual nodes 118. The sink node 118(4) may shift a destination address field of the path tracing packet 122 (e.g., by 16-bits) to determine that the path tracing packet 122 includes the SRv6 uSID instruction. For instance, the SRv6 uSID instruction may be included within a uSID block of the path tracing packet 122 that indicates the respective segments where the packet is to be sent.

In some examples, the collector 116 of the network 102 may receive the telemetry data 124 and determine a path taken by the path tracing packet 122 through the network 102 using the short interface IDs that each of the nodes 118 appended to the path tracing packet 122. In some instances, the collector 116 may further use the network topology information, in addition to the short interface IDs, to determine the path. The collector 116 may also, in some examples, store the determined path in the one or more databases 114 to be analyzed by other components, such as the controller 110. For instance, the controller 110 may analyze the stored path to detect anomalies in the network 102, such as a wrong short path, wrong ECMP, a failed link and/or node, etc.

Additionally, or alternatively, the collector 116 may determine the full timestamp of each of the midpoint nodes 118(2) and 118(3). The full timestamp for each of the midpoint nodes 118(2) and 118(3) may be determined by combining the recorded short timestamp and the most significant bit of the full timestamp constructed at the previous node. For instance, for the first midpoint node 118(2), the full timestamp may be determined by combining (e.g., adding) the short timestamp recorded by the first midpoint node 118(2) and the most significant bit of the full timestamp recorded by the source node 118(1).

An example algorithm for computing the full timestamps may be defined as: (1) where TS(k) is the N-bits full timestamp of node k; (2) where TS_short(k) is the short timestamp collected at node k; and (3) for each node k in the recorded packet path: (a) retrieve the position (P) and number of bits (M) of the recorded short timestamp at node k configuration from the node config exported to the controller; (b) TS(k)[N:P]=TS(k−1[N:P]; (c) TS(k)[P:P−M]=TS_short(k); (d) TS(k)[P−M:0]=0. In the above algorithm, for the first node k in the recorded packet path, node k−1 is the source node; in operation (b), the most significant bit is copied from the full timestamp of the previous node; in operation (c), the short timestamp is copied from the path trace packet; and in operation (d) the least significant bit is set to zero.

In some examples, the collector 116, the controller 110, or an analyzer of the network 102 may analyze the collected timestamps to determine various use cases. Some of these use cases may include calculating a per-link delay, as well as leveraging the per-link delay to calculate paths for given delay SLAs. Additionally, or alternatively, the uses cases may include calculating an edge-to-edge delay (e.g., delay between the source node 118(1) and the sink node 118(4)), which may be possible in nanoseconds precision if both the source node 118(1) and the sink node 118(4) add their full timestamps to the path tracing packet 122. Additionally, or alternatively, delays for given paths may be monitored based on the collected timestamps.

Figures 2A, 2B:
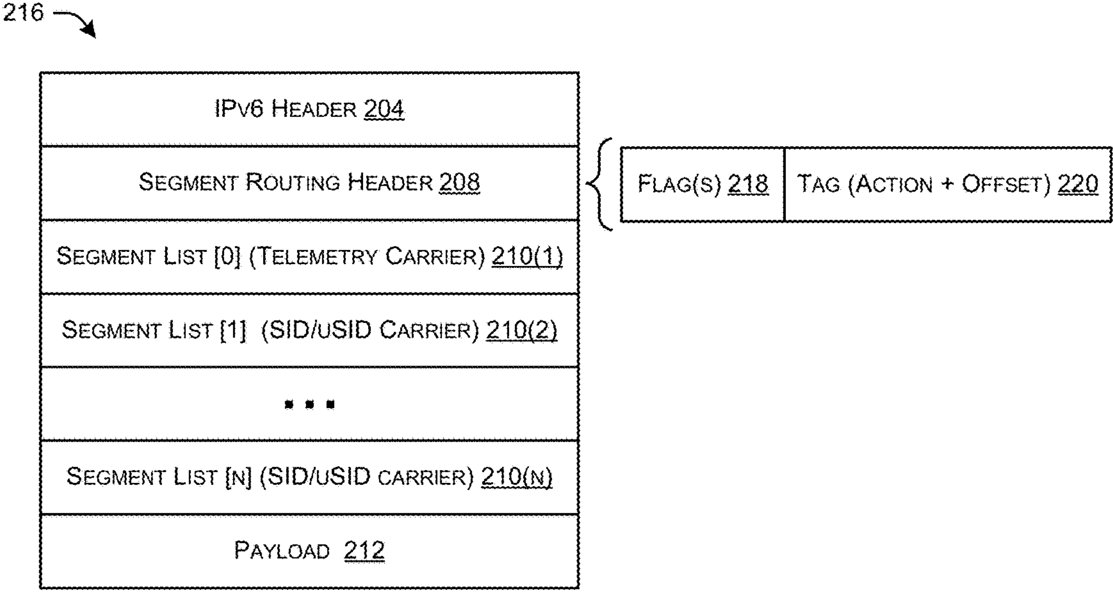
FIGS. 2A and 2B are block diagrams illustrating example packet structures that may be used to carry telemetry data and/or program a node to perform a path tracing action.

FIGS. 2A and 2B are block diagrams illustrating example packet structures that may be used to carry telemetry data and/or program a node to perform a path tracing action. The packet 200 includes an IPv6 header 204, a hop-by-hop (HBH) header 206 that may be used to carry telemetry data, a segment routing header 208, a segment list including one or more segment list fields 210(1)-210(N) (where N represents any number greater than or equal to 1) capable of carrying segment identifiers or uSIDs, and a payload 212. The HBH header 206 may also include an "action" and "offset" as described in further detail below.

The packet 202 also includes the IPv6 header 204, the segment routing header 208, the segment list including the one or more segment list fields 210(1)-210(N), and the payload 212. However, in comparison to the packet 200, the packet 202 includes a segment routing header (SRH) type length value (TLV) field 214 that may be used as the telemetry carrier.

In FIG. 2B, the packet 216 also includes the IPv6 header 204, the segment routing header 208, the segment list including the one or more segment list fields 210(1)-210(N), and the payload 212. However, in the packet 216, the last segment list field 210(1) is used as the telemetry data carrier, whereas the other segment list fields 210(2)-210(N) are used as a traditional SID or SRv6 uSID carrier. The segment routing header 208 may include a Flag(s) field 218 that may be used to enable path tracing behaviors. For instance, by enabling the flag "T," nodes that receive the packet 216 may recognize that telemetry data is to be added to the packet and, accordingly, read the Tag field 220. The Tag field 220 may be a 16-bit field in which 8 of the 16 bits are used to indicate an "action," and the other 8 of the remaining 16 bits are used to indicate an "offset." As described herein, the action bits may indicate the type of telemetry data (e.g., short timestamp data, short interface ID, etc.) that a node is to append to the packet 216. Additionally, the offset bits may indicate a specific location (e.g., bit location) within the segment list [0] field 210(1) of the packet 216 where the node is to append (insert or update) the telemetry data at. In some instances, after a first node appends telemetry data at the offset location within the segment list [0] field 210(1), the first node may modify the offset bits to point to a next available location (e.g., next bit location) within the segment list [0] field 210(1) where a second node is to begin appending telemetry data. In using hop-by-hop option, the offset and telemetry data is carried in the hop-by-hop option. The offset field identifies the location in the option where second node appends the telemetry data.

Figures 3A, 3B:
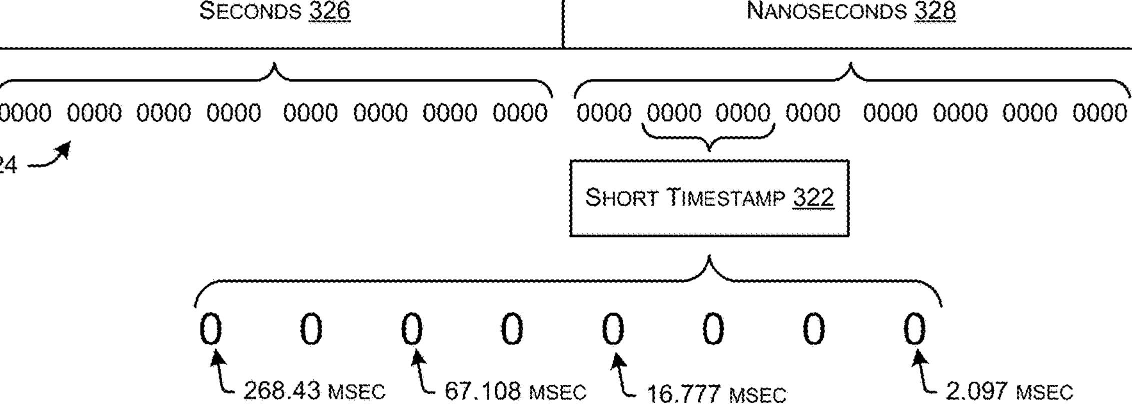
FIG. 3A is a block diagram illustrating an example telemetry data carrier of a packet that is being used to carry compressed midpoint data (CMD).
FIG. 3B illustrates an example 64-bit full timestamp. An exemplary short timestamp as described herein may include one or more bits of the full timestamp, and the short timestamp shown in FIG. 3B is an 8-bit timestamp.

FIG. 3A is a block diagram illustrating an example telemetry data carrier portion 300 of a packet that is being used to carry compressed midpoint data (CMD). The compressed midpoint data may include short interface identifiers, short timestamps, and the like. In some examples, a respective row of the telemetry data carrier 300 (e.g., the first row including the CMD 302(1)-302(4)) may correspond to an HBH field, an SRH TLV field, a segment list field, and the like. The telemetry data carrier 300 may carry the CMDs 302(1)-302(N) (where N represents any number greater than or equal to 1). The CMDs 302(1)-302(N) may correspond with interfaces of midpoint nodes, such as the midpoint nodes 118(2) and 118(3). Additionally, the telemetry data carrier 300 may also carry a source node full timestamp 304 and a sink node full timestamp 306. These timestamps may be associated with a time at which a packet was handled (e.g., sent, received, etc.) by the source node and the sink node. In some examples, if the CMDs 302 represent short interface IDs, the number of bits required to represent the interface IDs may be upper bounded by a maximum number of interfaces on a node/router. In this case, an interface ID assigned to an interface will be unique within its own node/router. For instance, in a network where the maximum interfaces of any given router is equal to $2^n$, the interface IDs would need to be at most n-bits in length to represent the interface ID. The Interface IDs may not be required to be unique in a network or unique on a node.

FIG. 3B illustrates an example 64-bit full timestamp 320. An exemplary short timestamp 322 as described herein may include one or more bits 324 of the full timestamp 320, and the short timestamp 322 shown in FIG. 3B is an 8-bit timestamp. The 64-bit full timestamp 320 may include 32 bits that represent a seconds portion 326 of the full timestamp 320 and 32 bits that represent a nanoseconds portion 328 of the full timestamp 320. The positioning of the short timestamp 322 with respect to the bits 324 may represent a short timestamp that is for a 5G deployment. In some examples, the short timestamp 322 may be associated with a precision of 2.097 microseconds (as shown by the least significant bit of the short timestamp 322 with value of 2.097 msec) and a rollover of 536.86 milliseconds (as shown by doubling the value of the most significant bit with value 268.43 msec). In other words, the short timestamp 322 may be optimal for use in a network in which the delay time between a source node and a sink node is less than 536.86 milliseconds, and the delay time between individual nodes is greater than 2.097 microseconds. In at least one example, different nodes of the network may select different bits 324 of the full timestamp 320 for use in the short timestamp 322. In other words, the bit selection does not need to be the same for every node along a given path.

Figure 4A:
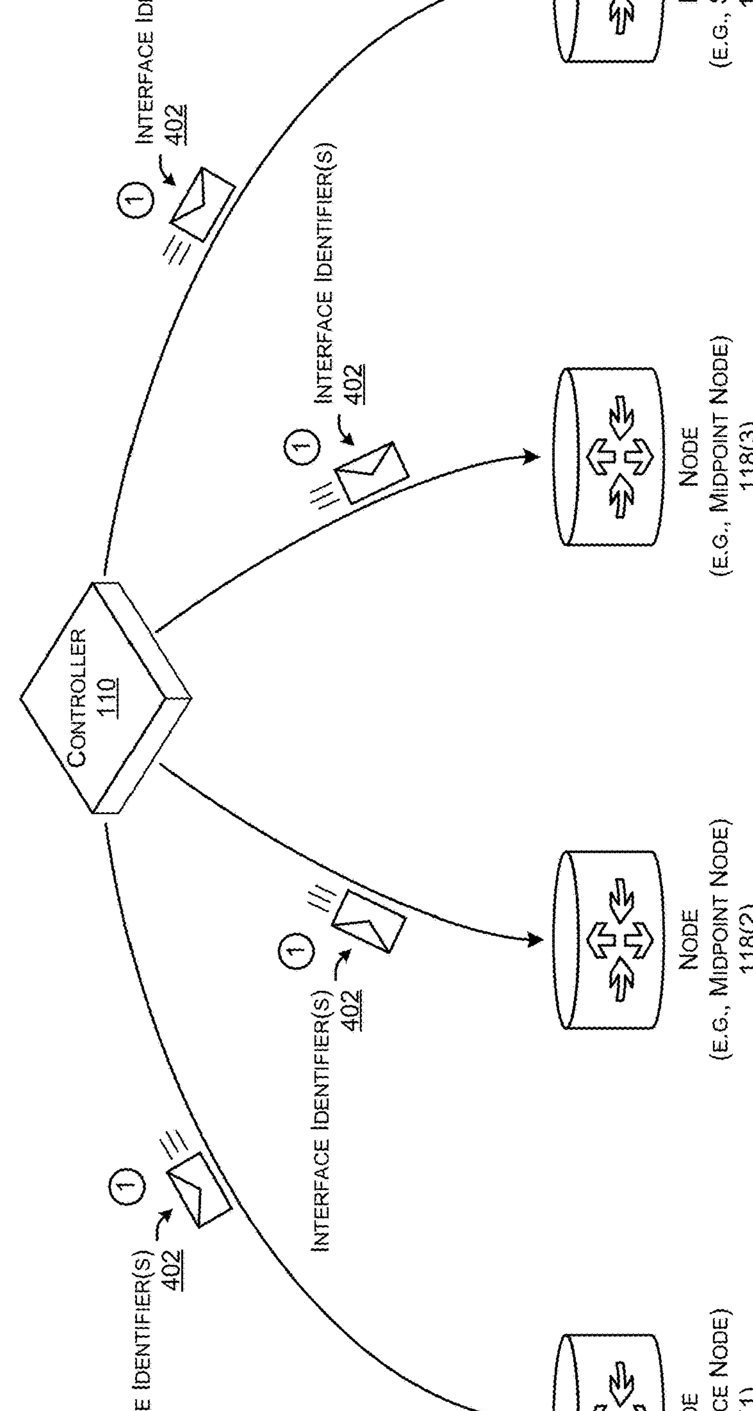
FIGS. 4A and 4B collectively illustrate an example traffic flow between nodes and/or devices of a network to perform some of the techniques described herein for optimizing telemetry data collection.
Figure 4B:
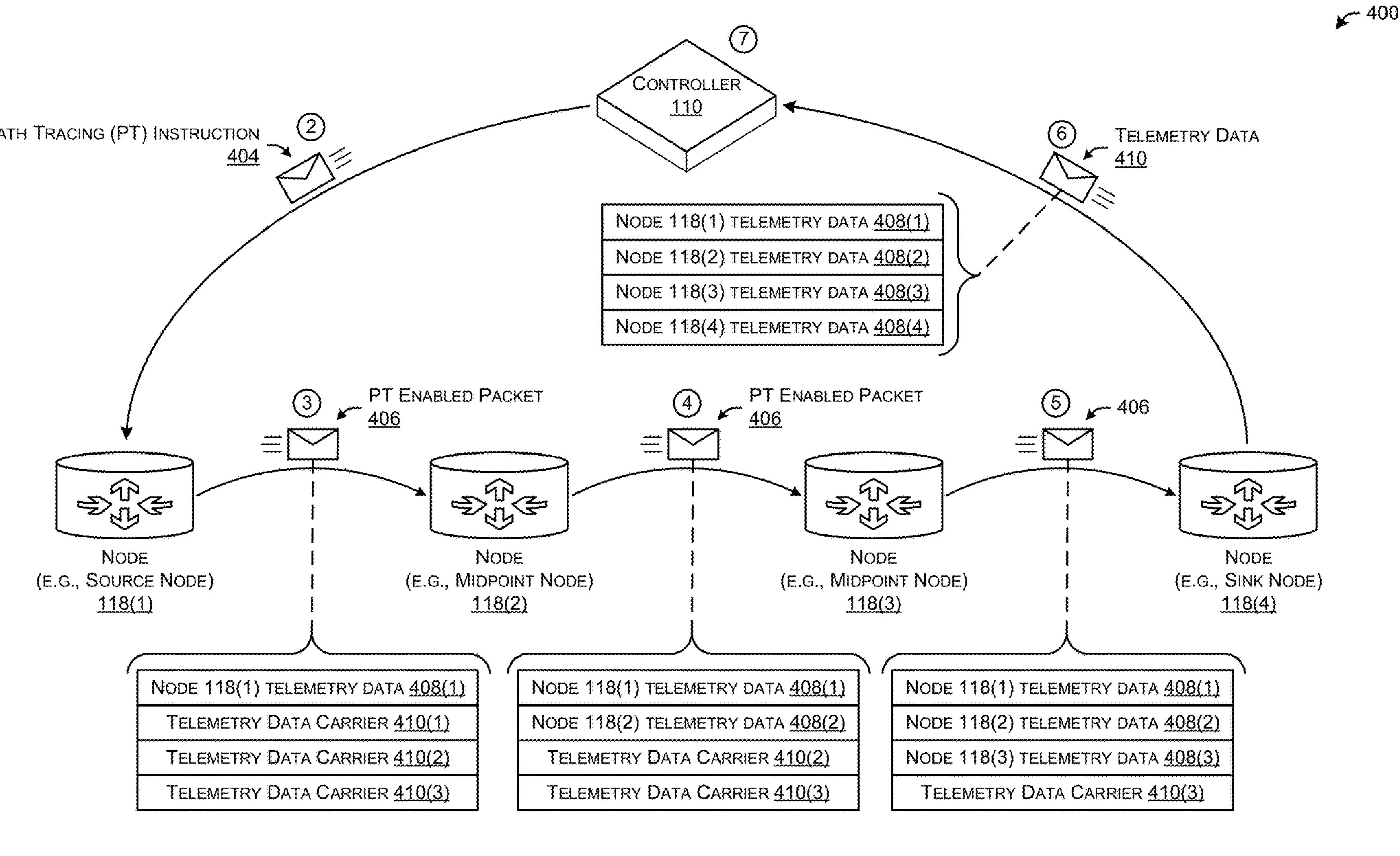

FIGS. 4A and 4B collectively illustrate an example traffic flow between nodes and/or devices of a network to perform some of the techniques described herein for optimizing telemetry data collection. In FIG. 4A, at "1," the controller 110 of the network may assign interface identifiers 402 to respective interfaces of the nodes 118. For instance, the controller 110 may assign a first interface ID to a first interface of the node 118(1), a second interface ID to a second interface of the node 118(1), a third interface ID to an interface of the node 118(2), and so forth. In some examples, the controller 110 may send the indications of the interface identifiers 402 to the nodes 118 at different times, or substantially simultaneously. The controller 110 may assign the interface identifiers 402 to the nodes 118 based on receiving configuration data associated with each of the nodes 118.

With respect to FIG. 4B, at "2," the controller 110 may send a path tracing instruction 404 to the source node 118(1) to instruct the source node 118(1) to start a telemetry collection session (for path tracing and/or delay measurements) using injected probes, in band data traffic flows, or by sampling data traffic flows. The source node 118(1) may receive the path tracing instruction 404 from the controller 110 and start a telemetry collection session. For instance, the source node 118(1) may allocate room in the telemetry collection packet/header of a path tracing enabled packet 406 for a number of hops specified in the path tracing instruction 404. The source node 118(1), as part of allocating the room in the telemetry collection packet/header of the path tracing enabled packet 404, may include an indication in the packet that instructs the downstream nodes 118(2)-118(4) as to a type of telemetry data that the downstream nodes 118(2)-118(4) are to add to the packet, as well as a specific location in the packet where the downstream nodes 118(2)-118(4) are to append the telemetry data. For instance, the source node 118(1) may specify that the midpoint node 118(2) is to append its telemetry data at a first location within the telemetry data carrier 410(1), that the midpoint node 118(3) is to append its telemetry data at a second location within the telemetry data carrier 410(2), and that the sink node 118(4) is to append its telemetry data at a third location within the telemetry data carrier 410(3). This may minimize the amount of work to be done by the downstream nodes 118(2)-118(4), resulting in minimal delay and/or more precise delay measurements. In some examples, the source node 118(1) may record its short interface ID of an outgoing interface used to send the path tracing enabled packet 406 as telemetry data 408(1) within the path tracing enabled packet 406. Additionally, or alternatively, the source node 118(1) may record its full timestamp, which may then be used to determine full timestamps for the downstream nodes 118 (2)-118(4) (which may append their short timestamps). In some instances, the source node 118(1) may record the interface ID and/or the timestamp at the end of the telemetry data carrier such that the downstream nodes 118(2)-118(4) may not have to write as deep in the packet to record their telemetry data.

At "3," the source node 118(1) may send the path tracing enabled packet 406 including the node 118(1) telemetry data 408(1) to the midpoint node 118(2). The midpoint node 118(2) may receive the path tracing enabled packet 406 and append its own telemetry data 408(2) within the telemetry data carrier field 410(1) of the path tracing enabled packet 406. The node 118(2) telemetry data 408(2) may include a short timestamp and/or a short interface identifier used by the midpoint node 118(2) to receive or send the path tracing enabled packet 406.

At "4," the midpoint node 118(2) may forward the path tracing enabled packet 406 including the node 118(1) telemetry data 408(1) and the node 118(2) telemetry data 408(2) to the midpoint node 118(3). The midpoint node 118(3) may receive the path tracing enabled packet 406 and append its own telemetry data 408(3) within the telemetry data carrier field 410(2) of the path tracing enabled packet 406. The node 118(3) telemetry data 408(3) may include a short timestamp and/or a short interface identifier used by the midpoint node 118(3) to receive or send the path tracing enabled packet 406.

At "5," the midpoint node 118(3) may forward the path tracing enabled packet 406 including the node 118(1) telemetry data 408(1), the node 118(2) telemetry data 408(2), and the node 118(3) telemetry data 408(3) to the sink node 118(4). The sink node 118(4) may receive the path tracing enabled packet 406 and append its own telemetry data 408(4) within the telemetry data carrier field 410(3) of the path tracing enabled packet 406. The node 118(4) telemetry data 408(4) may include a full timestamp and/or a short interface identifier used by the sink node 118(4) to receive the path tracing enabled packet 406.

At "6," the sink node 118(4) may send all of the telemetry data 410 to the controller 110. The telemetry data 410 may include the node 118(1) telemetry data 408(1), the node 118(2) telemetry data 408(2), the node 118(3) telemetry data 408(3), and the node 118(4) telemetry data 408(4). In some instances, the sink node 118(4) may send the telemetry data 410 to the controller 110 upon detecting that the path tracing enabled packet 406 includes an SRv6 uSID instruction that is associated with one or more path tracing actions. The one or more path tracing actions may be defined globally within the network or defined locally on each of the nodes 118. The path tracing actions may include sending the telemetry data 410 to the controller 110. Additionally, the path tracing action may include cloning the path tracing enabled packet 406 and sending the cloned packet to the controller 110, the cloned packet including the telemetry data 410. In some examples, the node 118(4) may encapsulate the telemetry data 410 to send it to the controller 110.

FIGS. 5-8 illustrate logic flow diagrams of various example methods associated with the technologies presented herein for optimizing telemetry data collection for path tracing and delay measurement techniques. The logical operations described herein with respect to FIGS. 5-8 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
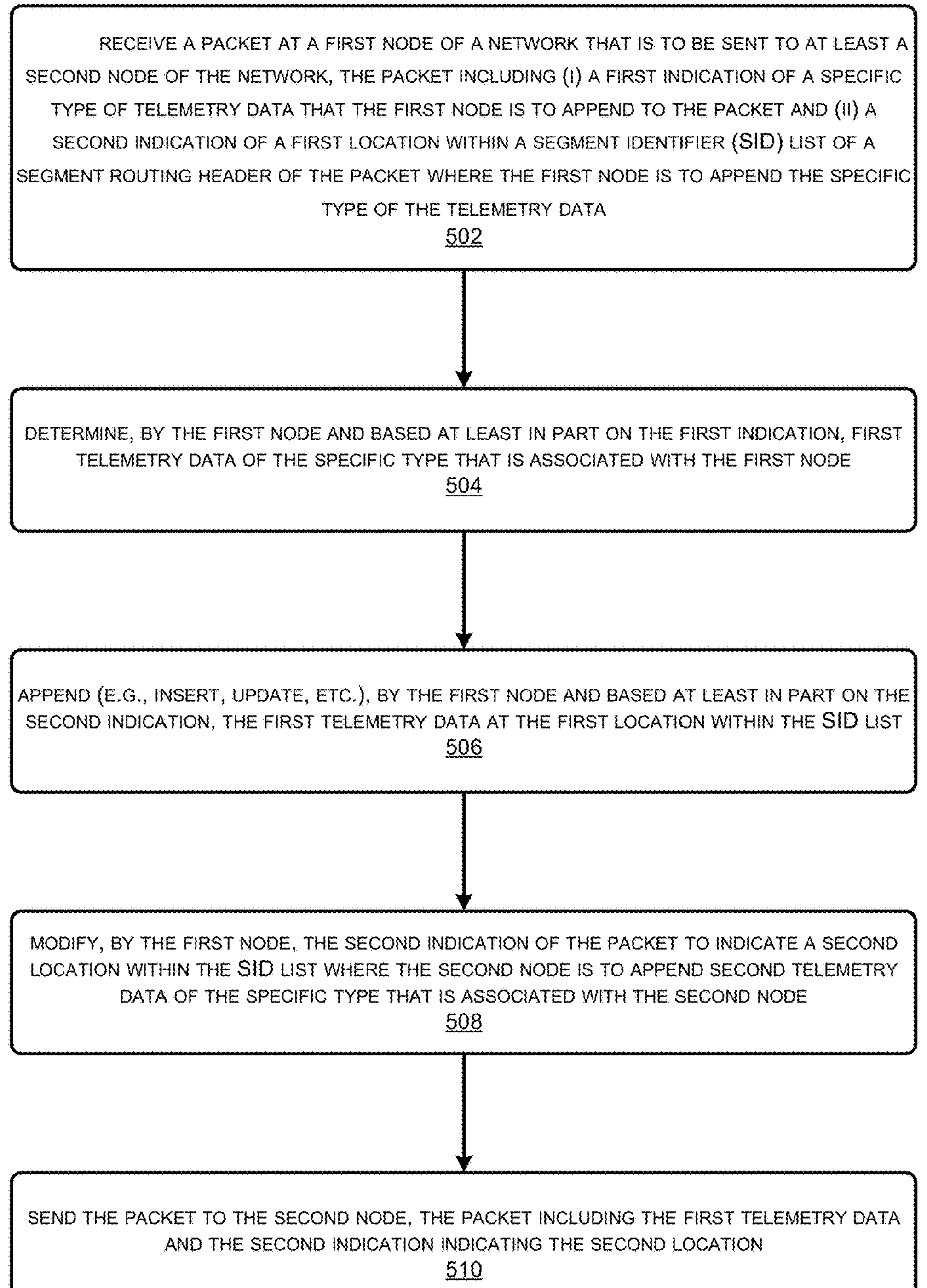
FIG. 5 is a logic flow diagram illustrating an example method that may be performed at least partially by a node of a network to append telemetry data to a packet.

FIG. 5 is a logic flow diagram illustrating an example method 500 that may be performed at least partially by a node of a network to append telemetry data to a packet. The method 500 begins at operation 502, which includes receiving a packet at a first node of a network that is to be sent to at least a second node of the network, the packet including (i) a first indication of a specific type of telemetry data that the first node is to append to the packet and (ii) a second indication of a first location within a segment identifier (SID) list of a segment routing header of the packet where the first node is to append the specific type of the telemetry data. For instance, the first indication and the second indication may be included within the Tag field 220 of the segment routing header 208. The first indication may indicate the "action" and the second indication may indicate the "offset."

At operation 504, the method 500 includes determining, by the first node and based at least in part on the first indication, first telemetry data of the specific type that is associated with the first node. For instance, the first node may determine a short timestamp that includes a portion (e.g., one or more individual bits) of a full timestamp representing a time at which the first node handled the packet. Additionally, or alternatively, the first node may determine a short interface ID indicative of an interface of the first node used to receive the packet.

At operation 506, the method 500 includes appending (e.g., inserting, updating, etc.), by the first node and based at least in part on the second indication, the first telemetry data at the first location within the SID list. For instance, the first node may append the short interface ID and/or the short timestamp at the first location within the SID list.

At operation 508, the method 500 includes modifying, by the first node, the second indication of the packet to indicate a second location within the SID list where the second node is to append second telemetry data of the specific type that is associated with the second node. And at operation 510, the method 500 may include sending the packet to the second node, the packet including the first telemetry data and the second indication indicating the second location.

Figure 6:
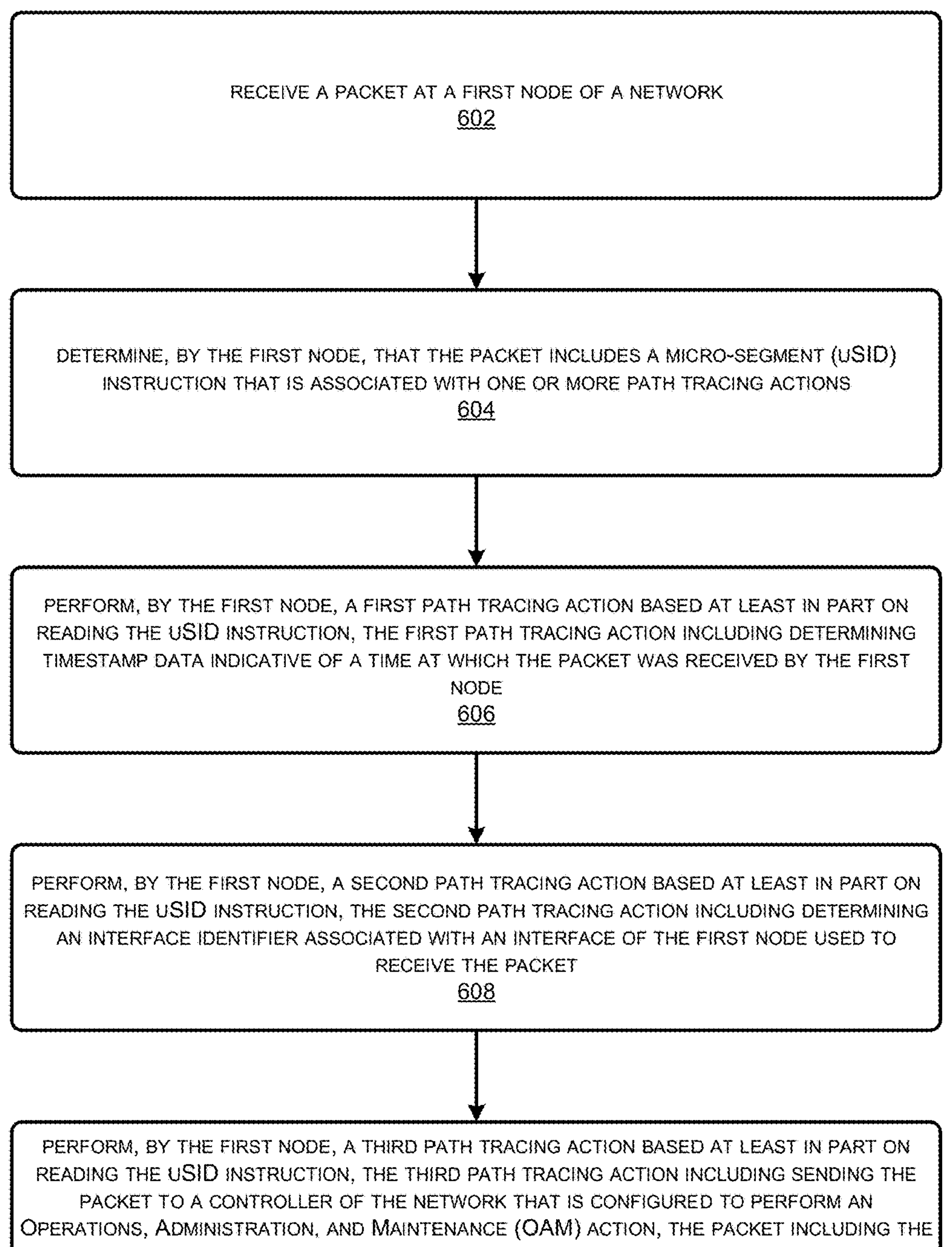
FIG. 6 is a logic flow diagram illustrating an example method that may be performed at least partially by a node of a network to perform one or more path tracing actions.

FIG. 6 is a logic flow diagram illustrating an example method 600 that may be performed at least partially by a node of a network to perform one or more path tracing actions. The method 600 begins at operation 602, which includes receiving a packet at a first node of a network. For instance, the packet may be received by the sink node 118(4) of the network 102.

At operation 604, the method 600 includes determining, by the first node, that the packet includes an SRv6 micro-segment (uSID) instruction that is associated with one or more path tracing actions. For instance, the first node may shift a destination address field of the packet to determine that the packet includes the SRv6 uSID instruction.

At operation 606, the method 600 includes performing, by the first node, a first path tracing action based at least in part on reading the SRv6 uSID instruction, the first path tracing action including determining timestamp data indicative of a time at which the packet was received by the first node. In some instances, the timestamp data may comprise a full timestamp and, in other instances, the timestamp data may comprise a short timestamp that includes a portion of the full timestamp.

At operation 608, the method 600 includes performing, by the first node, a second path tracing action based at least in part on reading the SRv6 uSID instruction, the second path tracing action including determining an interface identifier associated with an interface of the first node used to receive the packet. For instance, the first node may determine a short interface ID corresponding to the interface of the first node and append the short interface ID to the packet.

At operation 610, the method 600 includes performing, by the first node, a third path tracing action based at least in part on reading the SRv6 uSID instruction, the third path tracing action including sending the packet to a controller of the network that is configured to perform an Operations, Administration, and Maintenance (OAM) action, the packet including the timestamp data and the interface identifier.

Figure 7:
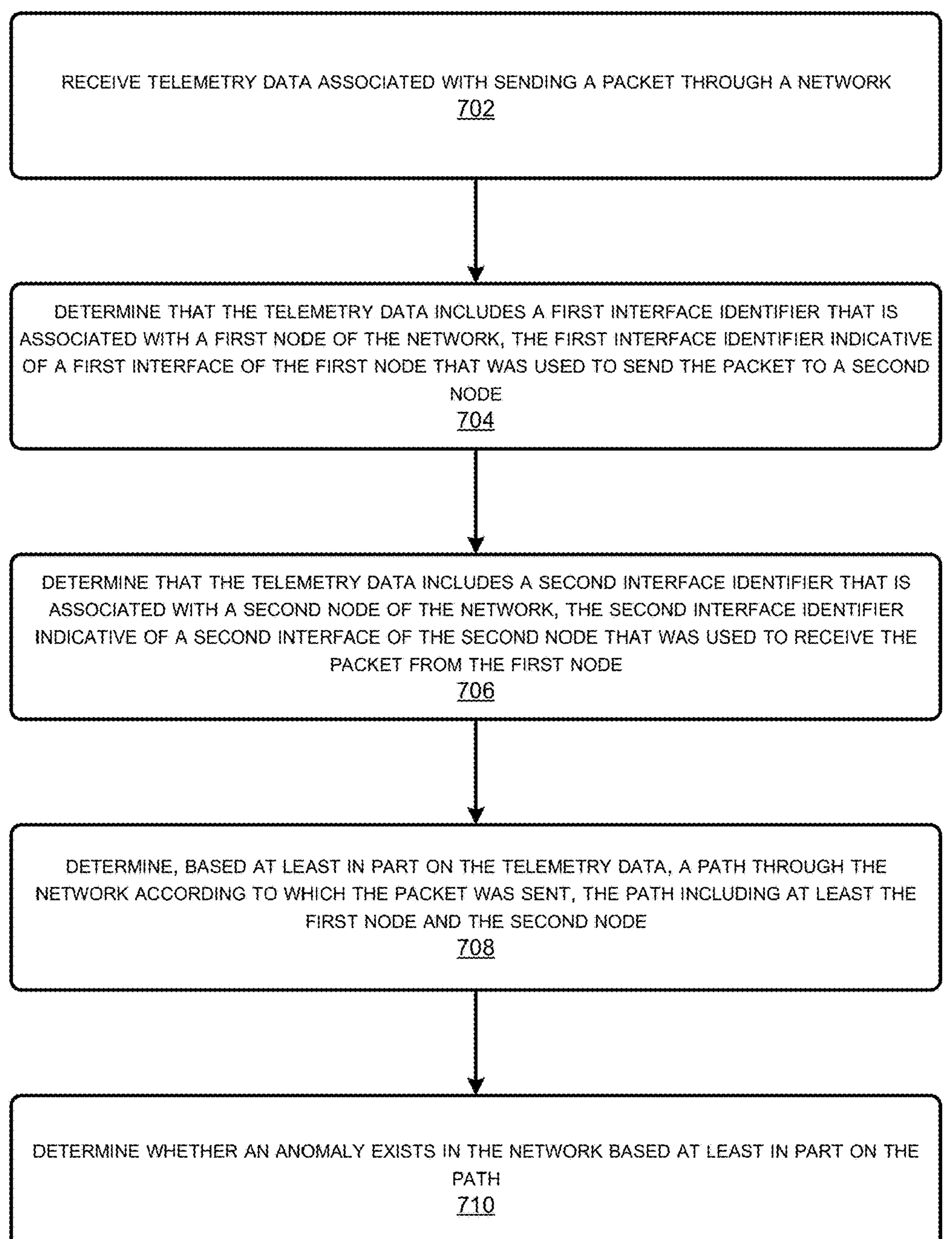
FIG. 7 is a logic flow diagram illustrating an example method that may be performed at least partially by a controller or collector of a network to determine a path that a packet traversed through the network.

FIG. 7 is a logic flow diagram illustrating an example method 700 that may be performed at least partially by a controller or collector of a network to determine a path that a packet traversed through the network. At operation 702, the method 700 begins by receiving telemetry data associated with sending a packet through a network. For instance, the telemetry data may be received by the controller 110 or the collector 116 of the network 102.

At operation 704, the method 700 includes determining that the telemetry data includes a first interface identifier that is associated with a first node of the network, the first interface identifier indicative of a first interface of the first node that was used to send the packet to a second node. For instance, the telemetry data may include a first short interface identifier indicative of an interface of the source node 118(1) used to send the packet.

At operation 706, the method 700 includes determining that the telemetry data includes a second interface identifier that is associated with a second node of the network, the second interface identifier indicative of a second interface of the second node that was used to receive the packet from the first node. For instance, the telemetry data may include a second short interface identifier indicative of an interface of the sink node 118(4) used to receive the packet.

At operation 708, the method 700 includes determining, based at least in part on the telemetry data, a path through the network according to which the packet was sent, the path including at least the first node and the second node. For instance, the controller 110 or the collector 116 may determine, based at least in part on the first interface identifier and the second interface identifier, that the packet was sent through at least the first node and the second node.

At operation 710, the method 700 includes determining whether an anomaly exists in the network based at least in part on the path. For instance, the controller 110 may determine that the path the packet took through the network was a wrong shortest path, a wrong ECMP path, that a failed link or node exists in the network 102, and/or the like.

Figure 8:
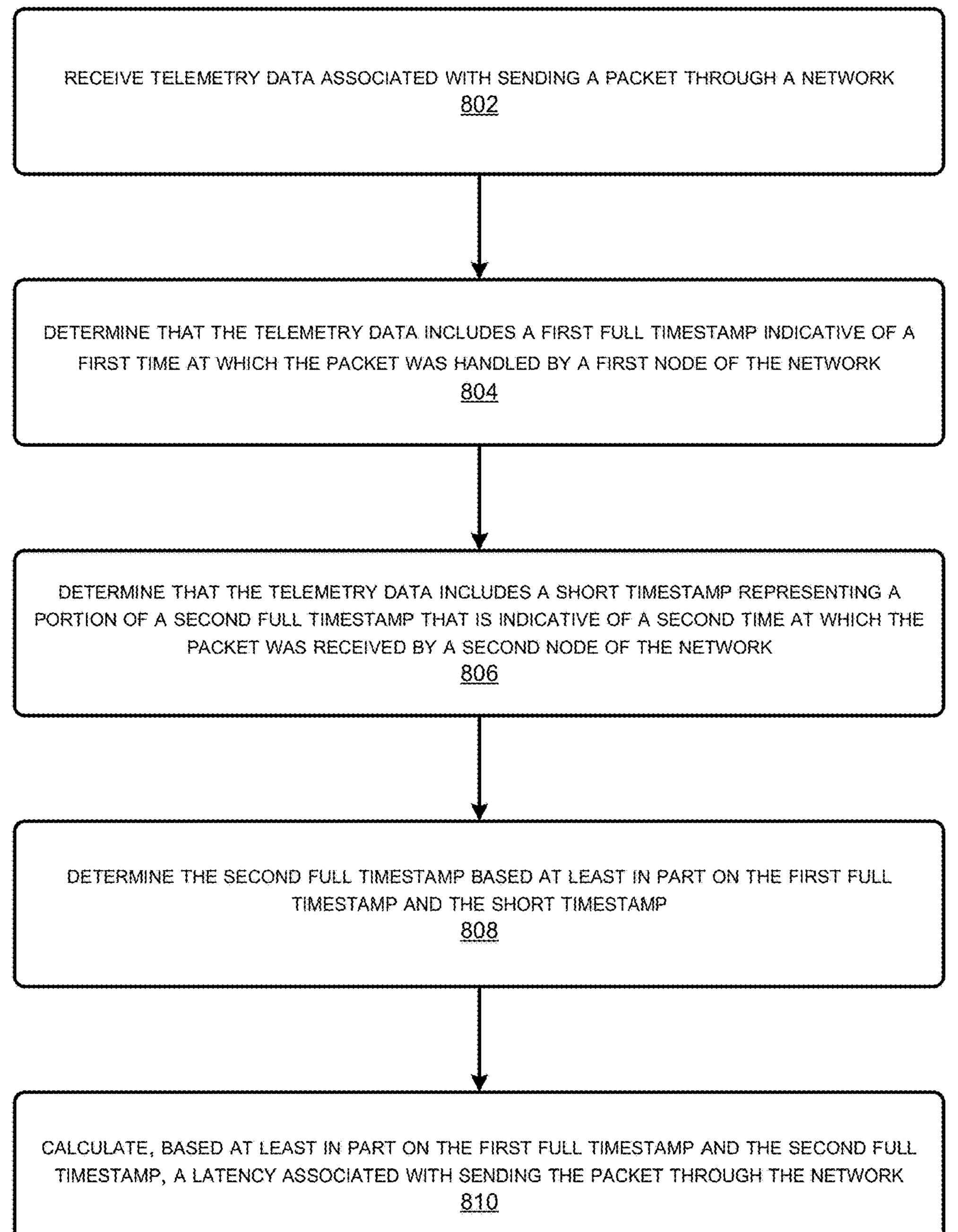
FIG. 8 is a logic flow diagram illustrating an example method that may be performed at least partially by a controller or collector of a network to determine a delay measurement associated with sending a packet through the network.

FIG. 8 is a logic flow diagram illustrating an example method 800 that may be performed at least partially by a controller or collector of a network to determine a delay measurement associated with sending a packet through the network. The method 800 begins at operation 802, which includes receiving telemetry data associated with sending a packet through a network. For instance, the telemetry data may be received by the controller 110 or the collector 116 of the network 102.

At operation 804, the method 800 includes determine that the telemetry data includes a first full timestamp indicative of a first time at which the packet was handled by a first node of the network. For instance, the telemetry data may include a first full timestamp corresponding to a time at which the source node 118(1) of the network 102 received or sent the packet.

At operation 806, the method 800 includes determining that the telemetry data includes a short timestamp representing a portion of a second full timestamp that is indicative of a second time at which the packet was received by a second node of the network. For instance, the telemetry data may include a short timestamp representing a portion of a second full timestamp that is indicative of a second time at which the packet was received by the midpoint node 118(2) of the network 102.

At operation 808, the method 800 includes determining the second full timestamp based at least in part on the first full timestamp and the short timestamp. For instance, the controller 110 or the collector 116 may determine the second full timestamp by combining the short timestamp and a most significant bit of the first full timestamp.

At operation 810, the method 800 includes calculating, based at least in part on the first full timestamp and the second full timestamp, a latency associated with sending the packet through the network. For instance, the latency may correspond to a link delay measurement between the first node and the second node.

Figure 9:
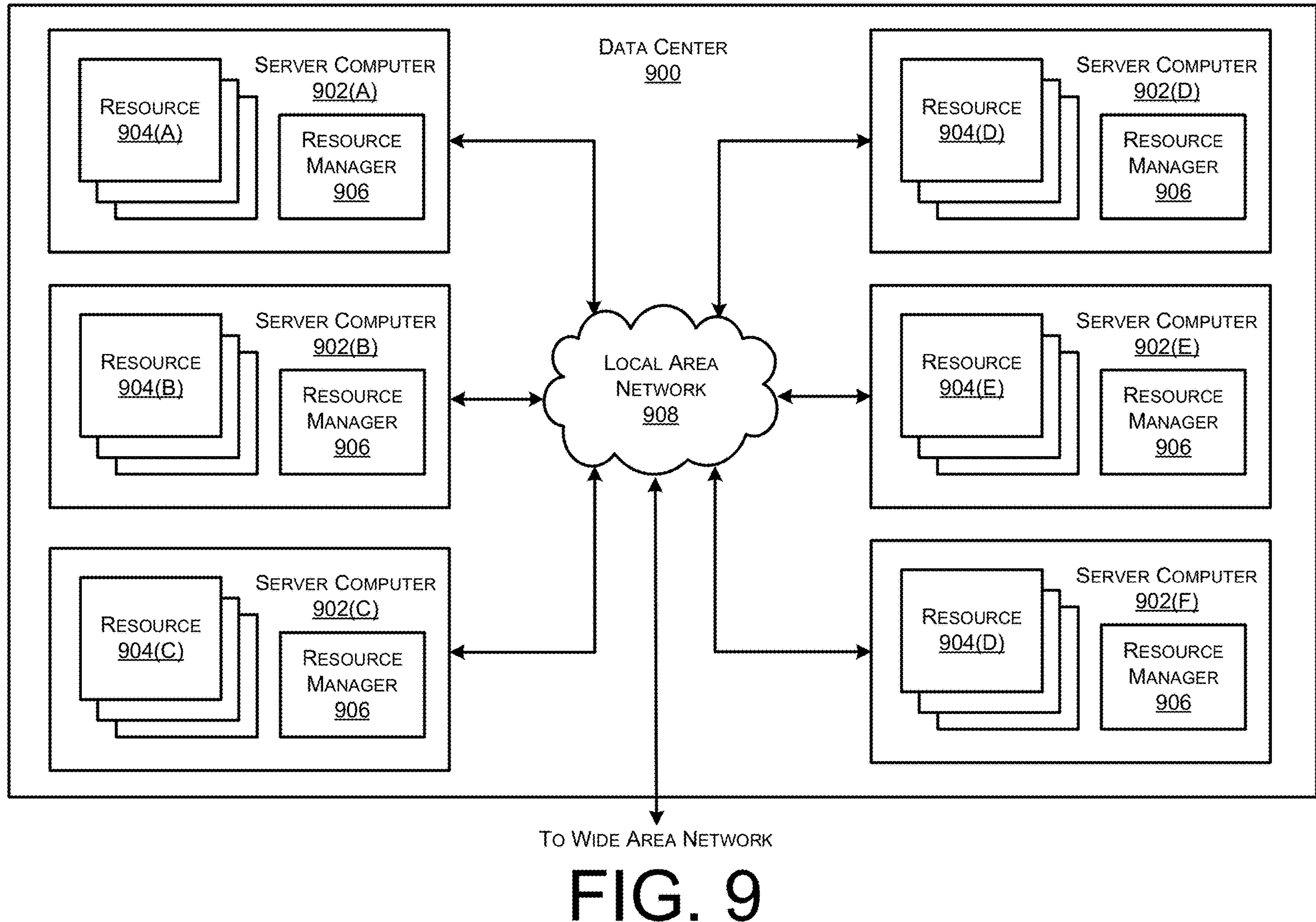
FIG. 9 is a system architecture diagram of an example configuration for a data center that can be utilized to implement aspects of the technologies disclosed herein.

FIG. 9 is a system architecture diagram of an example configuration for a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of computing device described herein. Although described as servers, the server computers 902 may comprise any type of networked device, such as servers, switches, routers, hubs, bridges, gateways, modems, repeaters, access points, etc.

The server computers 902 can be standard tower, rack-mount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, VPNs, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

In some instances, the data center 900 may provide computing resources, like applications, VM instances, VPN instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like tenant containers and VM instances, data storage resources, networking resources, data communication resources, network services, VPN instances, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
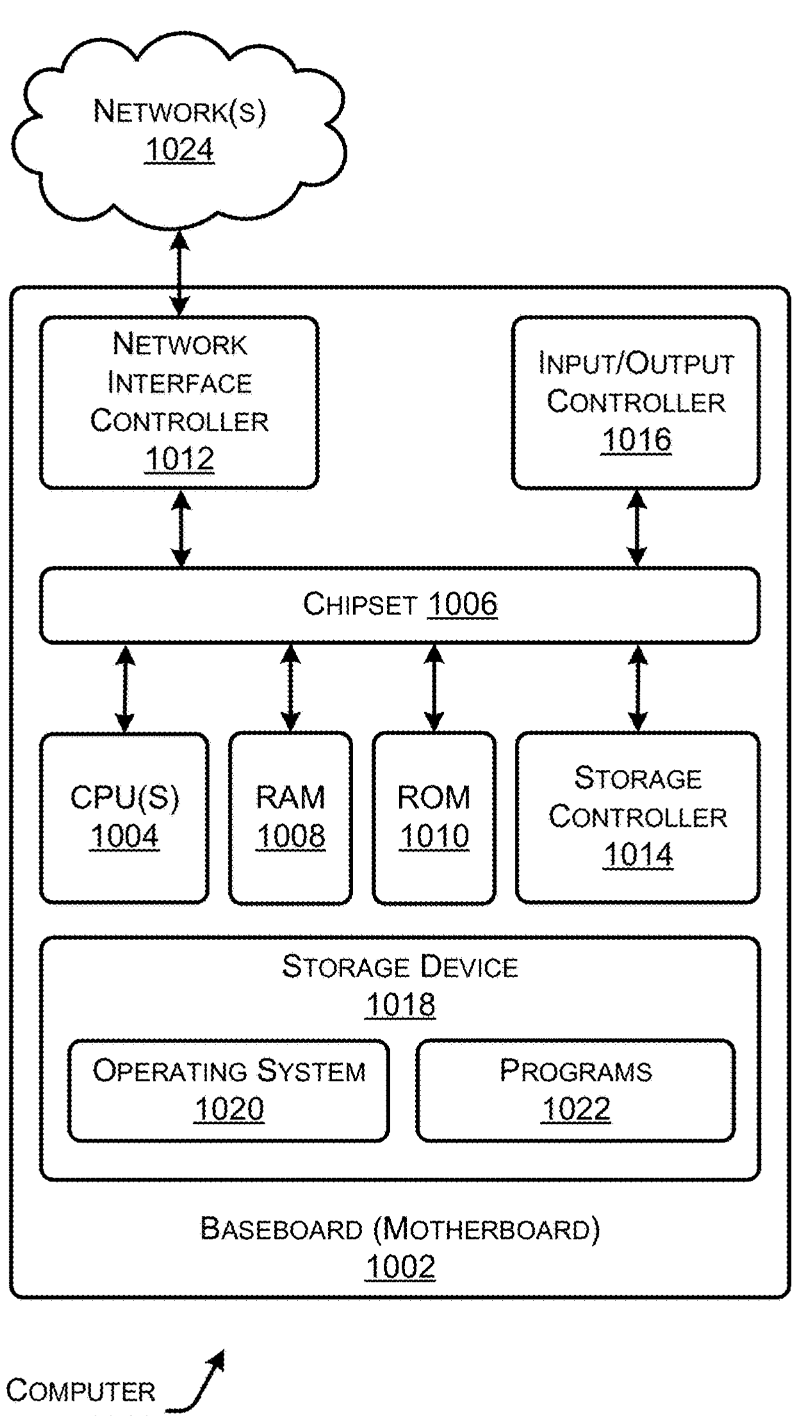
FIG. 10 illustrates a schematic view of an example computer-hardware architecture for implementing a node and/or a computing device that can be utilized to implement aspects of the various technologies presented herein.

FIG. 10 illustrates a schematic view of an example computer-hardware architecture for implementing a node and/or a computing device that can be utilized to implement aspects of the various technologies presented herein. The computer architecture shown in FIG. 10 illustrates a conventional server computer, network device, workstation, desktop computer, laptop, tablet, network appliance, e-reader, smartphone, and/or other computing device. The computer 1000 may comprise networked devices such as servers, switches, routers, hubs, bridges, gateways, modems, repeaters, access points, etc.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 102 and/or the network(s) 1024. The chipset 1006 can include functionality for providing network connectivity through a NIC 1012, such as a gigabit Ethernet adapter. The NIC 1012 is capable of connecting the computer 1000 to other computing devices over the network. It should be appreciated that multiple NICs 1012 can be present in the computer 1000, connecting the computer to other types of networks and remote computer systems. In some examples, the NIC 1012 may be configured to perform at least some of the techniques described herein and may include components for performing the techniques described herein.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the system-architecture 100 and or any components included therein, may be supported by one or more devices similar to computer 1000. Stated otherwise, some or all of the operations performed by the system-architecture 100, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As described herein, the computer 1000 may comprise one or more of data nodes, control nodes, firewall nodes, edge routers, and/or key-value stores. The computer 1000 may include one or more hardware processors 1004 (processors) configured to execute one or more stored instructions. The processor(s) 1004 may comprise one or more cores. Further, the computer 1000 may include one or more network interfaces (e.g., NIC 1012) configured to provide communications between the computer 1000 and other devices over a network, such as the network 102 and/or 1024. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for optimizing telemetry data for packet path tracing and/or delay measurement techniques.

While the invention is described with respect to the specific examples, it is to be understood that the scope of the invention is not limited to these specific examples. For instance, while many of the examples are described with respect to IPsec protocols, it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a node of a network, the method comprising:

determining that an address field of a header of a packet includes a path tracing instruction;

determining that the path tracing instruction indicates a path tracing action that is to be performed by the node;

performing the path tracing action to generate path tracing information;

encapsulating the packet with a new header to generate an encapsulated packet;

populating the new header with the path tracing information; and sending the encapsulated packet to another node of the network or to a control plane device of the network.

2. The method of claim 1, wherein the path tracing information includes at least one of an interface identifier associated with an interface of the node, interface load data indicating a load of the interface, or timestamp data.

3. The method of claim 1, wherein:

encapsulating the packet with the new header comprises encapsulating the packet with a new Internet Protocol version 6 (IPv6) header, a Segment Routing Header (SRH) that includes a Segment Identifier (SID) list, and an IPv6 Destinations Option header; and populating the new header with the path tracing information comprises populating the IPv6 Destinations Option header with the path tracing information.

4. The method of claim 1, wherein:

encapsulating the packet with the new header comprises encapsulating the packet with a new Internet Protocol version 6 (IPv6) Hop-by-Hop Header (HbH); and populating the new header with the path tracing information comprises populating a new IPv6 Option for Path Tracing in the IPv6 HbH with the path tracing information.

5. The method of claim 1, wherein:

the header is an Internet Protocol version 6 (IPv6) header;

the path tracing instruction is a Segment Routing over IPv6 (SRv6) micro segment (uSID) instruction; and determining that the address field includes the path tracing instruction includes shifting the address field of the IPv6 header of the packet.

6. The method of claim 1, wherein performing the path tracing action comprises:

determining timestamp data indicative of a time at which the packet was received by the node;

or determining an interface identifier associated with an interface of the node used to receive the packet.

7. The method of claim 1, further comprising cloning the packet and sending a clone of the packet to the control plane device, the clone of the packet including timestamp data and an interface identifier.

8. A node of a network comprising:

one or more processors; and one or more non-transitory computer-readable media storing instructions that, when executed, cause the one or more processors to perform operations comprising:

determining that an address field of a header of a packet includes a path tracing instruction;

determining that the path tracing instruction indicates a path tracing action that is to be performed by the node;

performing the path tracing action to generate path tracing information;

encapsulating the packet with a new header to generate an encapsulated packet;

populating the new header with the path tracing information; and sending the encapsulated packet to another node of the network or to a control plane device of the network.

9. The node of claim 8, wherein the path tracing information includes at least one of an interface identifier associated with an interface of the node, interface load data indicating a load of the interface, or timestamp data.

10. The node of claim 8, wherein:

encapsulating the packet with the new header comprises encapsulating the packet with a new Internet Protocol version 6 (IPv6) header, a Segment Routing Header (SRH) that includes a Segment Identifier (SID) list, and an IPv6 Destinations Option header; and populating the new header with the path tracing information comprises populating the IPv6 Destinations Option header with the path tracing information.

11. The node of claim 8, wherein:

encapsulating the packet with the new header comprises encapsulating the packet with a new Internet Protocol version 6 (IPv6) Hop-by-Hop Header (HbH); and populating the new header with the path tracing information comprises populating a new IPv6 Option for Path Tracing in the IPv6 HbH with the path tracing information.

12. The node of claim 8, wherein:

the header is an Internet Protocol version 6 (IPv6) header;

the path tracing instruction is a Segment Routing over IPv6 (SRv6) micro segment (uSID) instruction; and determining that the address field includes the path tracing instruction includes shifting the address field of the IPv6 header of the packet.

13. The node of claim 8, wherein performing the path tracing action comprises:

determining timestamp data indicative of a time at which the packet was received by the node;

or determining an interface identifier associated with an interface of the node used to receive the packet.

14. The node of claim 8, further comprising cloning the packet and sending a clone of the packet to the control plane device, the clone of the packet including timestamp data and an interface identifier.

15. A method performed at least partially by a node of a network, the method comprising:

determining that an address field of a header of a packet includes a path tracing instruction;

determining that the path tracing instruction indicates a path tracing action that is to be performed by the node;

performing the path tracing action; and sending at least one of the packet, a clone of the packet, or telemetry data associated with the path tracing action to another node of the network or to a control plane node of the network.

16. The method of claim 15, wherein determining that the address field includes path tracing instruction comprises shifting the address field of the header of the packet.

17. The method of claim 15, wherein the path tracing action comprises cloning the packet and sending the clone of the packet to the control plane node, the clone of the packet including timestamp data and an interface identifier.

18. The method of claim 15, wherein the path tracing action comprises determining timestamp data indicative of a time at which the packet was received by the node.

19. The method of claim 15, wherein the path tracing action comprises determining an interface identifier associated with an interface of the node used to receive the packet.

20. The method of claim 15, wherein the control plane node of the network is configured to perform an Operations, Administration, and Maintenance (OAM) action utilizing at least one of the packet, the clone of the packet, or the telemetry data, the OAM action comprising at least one of determining a path through the network according to which the packet was sent or determining a latency associated with the packet traversing the network.

* * * * *